(12) United States Patent
Palmer

(10) Patent No.: US 8,407,139 B1
(45) Date of Patent: Mar. 26, 2013

(54) CREDIT RISK EVALUATION WITH RESPONSIBILITY FACTORS

(75) Inventor: Frank P. Palmer, Grayslake, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 13/285,558

(22) Filed: Oct. 31, 2011

Related U.S. Application Data

(62) Division of application No. 11/462,892, filed on Aug. 7, 2006, now Pat. No. 8,086,523.

(51) Int. Cl.
*G06Q 40/00* (2006.01)

(52) U.S. Cl. .............. 705/38; 235/380; 705/35; 705/37; 705/39; 705/4; 463/25; 713/176; 715/757

(58) Field of Classification Search .................. 235/380; 705/35, 38, 39, 4; 463/25; 713/176; 715/757; 701/213
See application file for complete search history.

(56) References Cited

U.S. PATENT DOCUMENTS

| | | | |
|---|---|---|---|
| 6,064,970 A | 5/2000 | McMillan et al. | |
| 6,513,018 B1 | 1/2003 | Culhane | |
| 2001/0039523 A1* | 11/2001 | Iwamoto | 705/35 |
| 2001/0056399 A1 | 12/2001 | Saylors | |
| 2002/0032645 A1 | 3/2002 | Nozaki et al. | |
| 2002/0111835 A1 | 8/2002 | Hele et al. | |
| 2002/0147679 A1* | 10/2002 | Tardif | 705/39 |
| 2003/0167191 A1 | 9/2003 | Slabonik et al. | |
| 2003/0216995 A1 | 11/2003 | DePauw et al. | |
| 2004/0059608 A1 | 3/2004 | Gore et al. | |
| 2004/0153384 A1* | 8/2004 | Whipple et al. | 705/35 |
| 2004/0220784 A1 | 11/2004 | Stephenson et al. | |
| 2006/0212386 A1* | 9/2006 | Willey et al. | 705/38 |
| 2006/0242050 A1* | 10/2006 | Haggerty et al. | 705/35 |
| 2007/0027726 A1 | 2/2007 | Warren et al. | |
| 2007/0136162 A1 | 6/2007 | Thibodeau et al. | |
| 2007/0162365 A1* | 7/2007 | Weinreb | 705/35 |
| 2007/0226014 A1 | 9/2007 | Alemayehu et al. | |
| 2007/0288271 A1* | 12/2007 | Klinkhammer | 705/4 |

OTHER PUBLICATIONS

Experian, The basics of risk scoring, http://pueblo.gsa.gov/cic_text/riskscore/risk.htm, downloaded Nov. 10, 2005, 4 pages.
Excerpt from "What's New for Insurance Reporters" for May 27, 2003, regarding credit-based insurance scores as well as a report prepared by NAII on the most current legislative activity on this issue in each state, http://www.insurance-portal.com/0529031.htm, downloaded Nov. 10, 2005, 17 pages.
Insurance Information Institute, Credit Scoring, Aug. 2005, http://iii.org/media/hottopics/insurance/creditscroing, downloaded Nov. 10, 2005, 7 pages.
Electronic Privacy Information Center, Credit Scoring, http://www.epic.org/privacy/creditscoring, retrieved Nov. 10, 2005, 4 pages.

(Continued)

*Primary Examiner* — Tien Nguyen
(74) *Attorney, Agent, or Firm* — Banner & Witcoff, Ltd.

(57) ABSTRACT

A system, device, and method for calculating an enhanced credit score using insurance rating information, individual rating factors, interaction rating factors, geographic rating factors, vehicle monitoring rating factors, and/or credit risk information is disclosed. Insurance rating information, individual rating factors, interaction rating factors, geographic rating factors, and vehicle monitoring rating factors, either individually or in combinations, may be used as inputs to a novel credit-scoring model to calculate an enhanced or improved credit score. The novel credit-scoring model may be implemented in a computer-readable medium comprising computer-executable instructions for causing a computing device to calculate an enhanced credit score. The computer-executable instructions may be arranged into an input module, output module, and calculation module. The modules may be used to calculate an enhanced credit score that may be used by lending institutions and others to determine the terms of a financing agreement with a user.

21 Claims, 3 Drawing Sheets

OTHER PUBLICATIONS

ChoicePoint, C.L.U.E.® Personal Property, How to Read Your Report, © 2003-2004, CoicePoint Asset Company, 2 pages.

Bankrate.com, How credit scores work, how a score is calculated, Pat Curry, http://www.bankrate.com/brm/news/credit/socring/20031104a1.asp, downloaded Nov. 10, 2005, © 2005 Bankrate, Inc., 2 pages.

Bankrate.com, How credit scores work, how a score is calculated, Pat Curry, http://www.bankrate.com/brm/news/credit/socring/20031104a2.asp, downloaded Nov. 10, 2005, © 2005 Bankrate, Inc., 3 pages.

Bankrate.com, 25 need-to-know credit-scoring terms, Pat Curry, http://www.bankrate.com/brm/news/credit-scoring/20031104b1.asp, downloaded Nov. 10, 2005, © 2005 Bankrate, Inc, 3 pages.

Allstate.com, Why Does Allstate Use Credit Information to Evaluate Insurance Policies?, http://www.allstate.com/About/PagePrint.asp?page=credit.htm, © 2005 Allstate Insurance Company, downloaded Nov. 10, 2005, 4 pages.

The Use of Insurance Credit Scoring in Automobile and Homeowners Insurance, A report to the Governor, the Legislature and the People of Michigan, Frank M. Fitzgerald, Commissioner, Dec. 2002, 46 pages.

Rutgers New Burnswick/Piscataway Campus, Traffic Violations, http://sls.rutgers.edu/traffic.htm, downloaded Nov. 11, 2005, © 2003 Rutgers, The State University of New Jersey, 7 pages.

Realtor.org, FTC's Credit and Insurance Scores Study under the FACT Act, Aug. 16, 2004, Joseph M. Ventrone, http://www.realtor.org/gapublic.nsf/pages/ftcredsc?, downloaded Nov. 10, 2005, 5 pages.

RiskCapital, Solution Groups, http//www.riskcapital.com/Solutions/Credit/ExposureModel.aspx, 2 pages.

myFICO, About Credit Scores, http://wwwmyfico.com/CreditEducation/CreditScores.apsx@fire=5, downloaded Nov. 10, 2005, 10 pages.

NYS DMV (Brochure) Traffic Violations Bureau What to Do If You . . . , http://www.mydmv.state.ny.us/broch/c49htm, downloaded Nov. 11, 2005, © 2005, The New York State Department of Motor Vehicles, 5 pages.

Prosecution File History as of Oct. 31, 2011 for U.S. Appl. No. 11/462,879, filed Aug. 7, 2006, Frank P. Palmer.

Prosecution File History as of Oct. 31, 2011 for U.S. Appl. No. 11/462,892, filed Aug. 7, 2006, Frank P. Palmer.

* cited by examiner

CREDIT RISK EVALUATION WITH RESPONSIBILITY FACTORS

This application is a divisional of U.S. patent application Ser. No. 11/462,892 entitled, "Credit Risk Evaluations With Responsibility Factors," filed Aug. 7, 2006, which is incorporated by reference herein in its entirety.

RELATED APPLICATIONS

This application is related to U.S. patent application Ser. No. 11/462,879, filed Aug. 7, 2006.

FIELD OF THE INVENTION

Aspects of the invention relate generally to using insurance-related information to enhance credit scoring. More particularly, the invention relates to using a computer to construct a novel credit-scoring model that considers insurance rating information, individual rating factors, interaction rating factors, geographic rating factors, and/or vehicle monitoring rating factors in calculating an enhanced credit score for a user.

DESCRIPTION OF THE RELATED ART

Credit scores can be mathematical summaries of a consumer's likelihood to repay a credit obligation as agreed. In other words, credit scores can be used to determine the probability that a consumer will fulfill his or her financial obligations. Credit scores can be calculated using credit score cards, which are sophisticated credit scoring methods developed by various organizations, such as credit bureaus. Credit score cards can be designed to be predictive of a consumer's likelihood of managing and repaying financial obligations, which include loans and bills. Credit score cards are sometimes also referred to as credit score formulas.

A commonly used credit bureau scoring method developed by Fair Isaac and Company is used to calculate a consumer's FICO® score. The FICO score is calculated by using five categories of credit data found in a consumer's credit report. These five categories and their corresponding percentage contribution to the FICO score are as follows: payment history—35%, amounts owed—30%, length of credit—15%, new credit—10%, and types of credit used—10%. These percentages may vary for some consumers, but generally reflect the factors used by credit bureaus in calculating a FICO score. The FICO score is sometimes referred to as the credit score reported by the Experian credit bureau. Different credit bureaus sometimes trademark their credit score under different names: Equifax calls their credit score the Beacon® score, and TransUnion calls their credit score the Empirica® score. These scores generally consider all the same types of credit risk information. The marks FICO, Beacon, and Emperica, as well as CLUE, CCD, A-PLUS, and Choicepoint (used subsequently) are owned by their respective owners. These marks are not associated or affiliated with the inventors or the assignee of the invention.

Some conventional credit risk information that can be considered in calculating a FICO score includes: account payment information on specific types of accounts; presence of bankruptcy public records, judgment public records, liens public records, wage attachment public records; presence of collection items and delinquency; severity of delinquency; amount past due on delinquent accounts; time since past due items, adverse public records, or collection items; number of past due items on file; number of accounts paid as agreed; amount owing on accounts; amount owing on specific types of accounts; lack of specific types of balances; number of accounts with balances; proportion of credit lines used; proportion of installment loan amounts still owed; time since accounts opened, and by specific account types; time since account activity; number of recently opened accounts, and proportion of accounts that are recently opened, by type of account; number of recent credit inquiries; time since recent account opening(s), by type of account; time since credit inquiries; re-establishment of positive credit history following past payment problems; and number of various types of accounts. The FICO score only looks at information in a consumer's credit history. The FICO score does not consider the following information in calculating a credit score: age, salary, occupation, title, employer, date employed or employment history, where a person lives, any interest rate being charged on a particular credit card or other account, and any items reported as child/family support obligations or rental agreements. Although FICO credit scores currently do not use the personal factors previously listed there are other credit scoring agencies that may include one or more of those factors listed.

SUMMARY OF THE INVENTION

Conventional methods of calculating a credit score of a user can be enhanced to better assess the creditworthiness of individuals or other credit users with little or no credit history. For example, some young people may have very little information under the types of credit risk factors listed above that are conventionally used to calculate a credit score of a user, whereas additional information could enhance the evaluation of their creditworthiness.

Prior art techniques do not provide as comprehensive an assessment of a user's credit risk as may be possible. Therefore, there is a benefit in the art for an improved method of calculating an enhanced credit score for a user and a computer system for enabling various aspects of that method.

Aspects of the invention overcome problems and limitations of the prior art by providing a computer-assisted method for calculating an enhanced credit score of a user. The enhanced credit score may be used to determine the terms of a financing agreement offered by a creditor to a user. A computer may receive credit risk information and insurance rating information, individual rating factors, interaction rating factors, geographic rating factors, and/or vehicle monitoring rating factors relating to a user. The computer may use all or part of that information/factors as an input to a credit-scoring model to calculate an enhanced credit score. For example, only the insurance rating information may be used as an input in one embodiment in accordance with aspects of the invention. In another example, insurance rating information is used along with credit risk information. In yet another example, a vehicle monitoring rating factor is used along with credit risk information. The enhanced credit score may be a numeric or non-numeric value. Also disclosed is a computing device configured to calculate an enhanced credit score for use in determining the terms of a credit agreement. The computing device may be comprised of a memory unit and processing unit.

The system may be comprised of a processing unit and memory unit comprising modules. In some embodiments of the invention, the present invention can be partially or wholly implemented with a computer-readable medium, for example, by storing computer-executable instructions or modules. For example, a computer-readable medium storing computer-executable instructions for causing a computing device to perform the steps for calculating an enhanced credit score is disclosed. The computer-readable medium may be stored in a memory unit and executed by a processing unit in a computing device. Of course, the methods and systems of the above-referenced embodiments may also include other additional elements, steps, or computer-executable instructions.

The details of these and other embodiments of the invention are set forth in the accompanying drawings and description below. Other features and advantages of aspects of the invention will be apparent from the description, drawings, and claims.

BRIEF DESCRIPTION OF THE DRAWINGS

Aspects of the invention may take physical form in certain parts and steps, embodiments of which will be described in detail in the following description and illustrated in the accompanying drawings that form a part hereof, wherein.

DETAILED DESCRIPTION OF THE INVENTION

Figure 1:
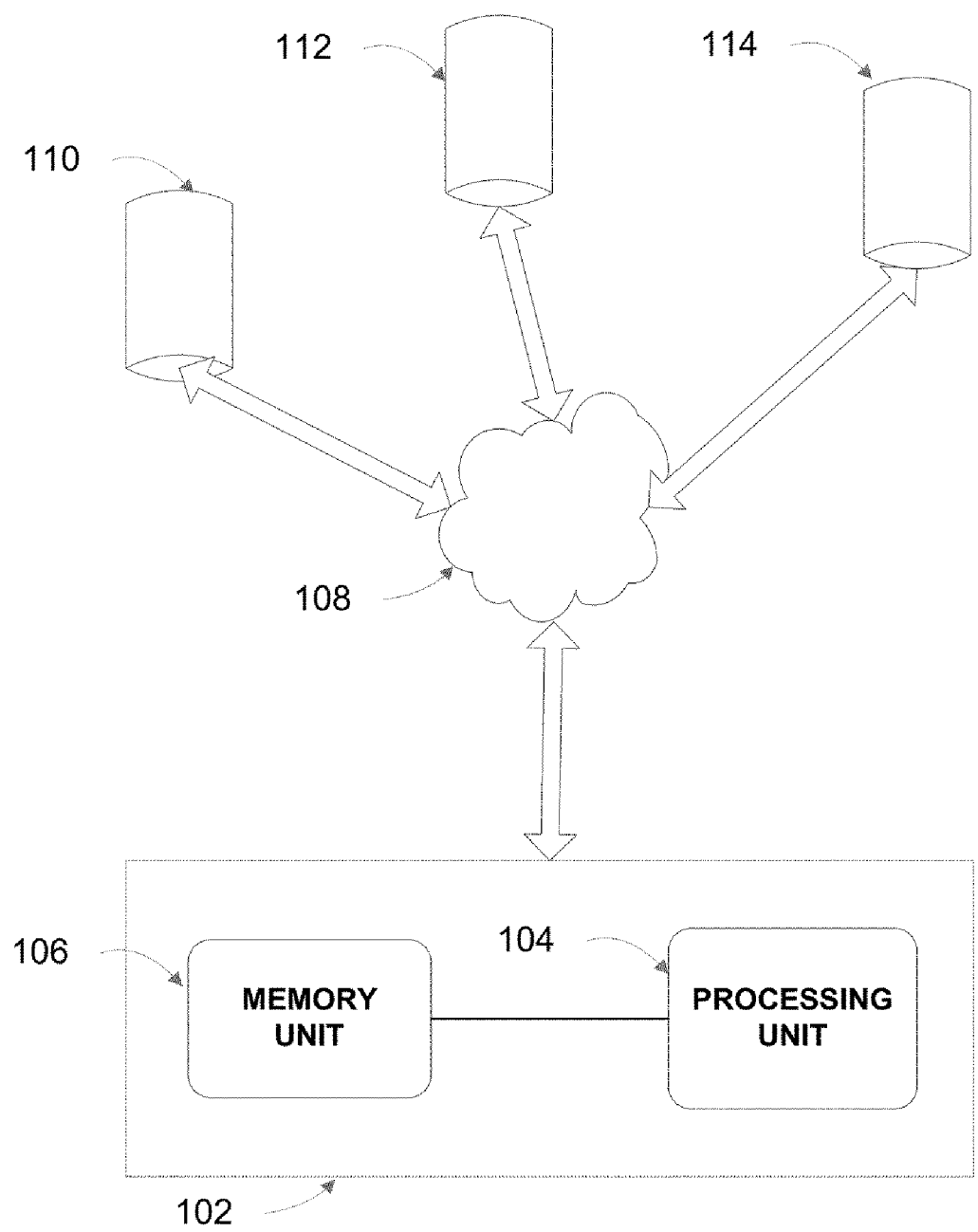
FIG. 1 depicts a simplified system diagram of various devices and/or databases in accordance with aspects of the invention.

In one illustrative embodiment in accordance with aspects of the invention, a user's enhanced credit score (ECS) may be generated by a statistical credit-scoring model, which is used to objectively evaluate information that pertains to making a credit or credit-related decision. The statistical model may consider conventional credit risk information (e.g., a user's FICO score, payment history, length of credit history, amount owed, types of credit used, new credit, etc.) as well as insurance rating information to calculate an enhanced credit score. (Note: Payment history can include account payment information on specific types of accounts (credit cards, retail accounts, installment loans, finance company accounts, mortgage, etc.), presence of adverse public records (bankruptcy, judgments, suits, liens, wage attachments, etc.), collection items, and/or delinquency (past due items), severity of any delinquency (how long past due), amount past due on delinquent accounts or collection items, time since (recency of) past due items (delinquency), adverse public records (if any), or collection items (if any), number of past due items on file, number of accounts paid as agreed. Amounts owed can include amount owing on accounts, amount owing on specific types of accounts, lack of a specific type of balance in some cases, number of accounts with balances, proportion of credit lines used (proportion of balances to total credit limits on certain types of revolving accounts), proportion of installment loan amounts still owing (proportion of balance to original loan amount on certain types of installment loans). Length of credit history can include time since accounts opened, time since accounts opened by specific type of account, and time since account activity. New credit can include number of recently opened accounts and proportion of accounts that are recently opened, by type of account; number of recent credit inquiries; time since recent account opening(s), by type of account; time since credit inquiry(s); re-establishment of positive credit history following past payment problems. Type of credit used can include number of (presence, prevalence, and recent information on) various types of accounts (credit cards, retail accounts, installment loans, mortgage, consumer finance accounts, etc.)). Alternatively, the statistical model may consider only insurance rating information to calculate an enhanced credit score. The enhanced credit score allows a decision-making entity or individual to more comprehensively and precisely assess the credit risk associated with a user. A user as used herein includes, but is not limited to, borrowers, prospective employees, customers, consumers, companies, organizations, and other entities and individuals for which a credit risk assessment is desired.

Numerous entities and individuals who perform or obtain credit risk assessments may use an enhanced credit score, in accordance with aspects of the invention, to assist in assessing a user's likelihood of being responsible and complying with their credit obligations. For example, lenders may use the enhanced credit score to assess the likelihood that a user will repay a debt obligation. The lender may use this assessment to determine the terms, if any, to offer a user attempting to borrow money from a bank. The lender may use the enhanced credit score to determine the amount of a loan to provide a user or the interest rate to charge on a loan amount. Moreover, a lender may adjust other terms of a loan (e.g., length of the loan, requirement for a guarantor, annual fee, type of loan, etc.) according to a user's enhanced credit score. In another example, a financing company at a car dealership may use a user's enhanced credit score to measure a user's potential credit risk and offer terms in a lease agreement accordingly. The financing company may adjust the payment amount for monthly lease payments and/or adjust the amount for down payment. In yet another example, a credit card (or debit card) company may use an enhanced credit score to more accurately assess the likelihood that a card holder will timely pay his or her monthly card bill. A credit card company may wish to adjust the terms (e.g., interest rate, annual fee, credit limit, payment options, payment terms, reward programs where the user receives cash back, buyer assurance, fraud protection, etc.) of the credit card according to this assessment. It will be apparent to one skilled in the art that there are numerous beneficial uses for an enhanced credit score contemplated by the invention.

Illustrative Operating Environment

An example of a suitable operating environment in which various aspects of the invention may be implemented is shown in the schematic diagram in FIG. 1. The operating environment 100 is only one example of a suitable operating environment and is not intended to suggest any limitation as to the scope of use or functionality of the invention. The operating environment 100 may be comprised of one or more databases 110, 112, 114 coupled to a computing device 102 through a network 108. The communication between the databases 110, 112, 114 and the computing device 102 may be through wired or wireless communication networks (depicted by network cloud 108). One or more networks may be in the form of a local area network (LAN) that has one or more of the well-known LAN topologies and may use a variety of different protocols, such as Ethernet. One or more of the networks may be in the form of a wide area network (WAN), such as the Internet. The computing device 102 and other devices (e.g., databases 110, 112, 114) may be connected to one or more of the networks via twisted pair wires, coaxial cable, fiber optics, radio waves or other media. The term "network" as used herein and depicted in the drawings should be broadly interpreted to include not only systems in which remote databases are coupled together via one or more communication paths, but also stand-alone devices that may be coupled, from time to time, to such systems that have storage capability. Consequently, the term "network" includes not only a "physical network" but also a "content network," which is comprised of the data—attributable to a single entity—which resides across all physical networks.

The plurality of databases 110, 112, 114 may contain information belonging to or maintained by an insurance company, government entity, and/or third-party entity. A computing device 102 may use this information as an input into a credit-scoring model to calculate an enhanced credit score. For privacy protection reasons, access to the information in these databases 110, 112, 114 may be restricted to only authorized computing devices 102 and for only permissible purposes. Access to these databases 110, 112, 114 may be restricted to only those persons/entities that have signed an agreement (e.g., an electronic agreement) acknowledging their responsibilities with regard to the use of and security to be accorded this information. Furthermore, the credit-scoring model in accordance with aspects of the invention only considers information in a manner that complies with the current laws in calculating an enhanced credit score of a user. One skilled in the art will recognize that should other information become permissible to use by law in the future, the entirety disclosed herein would enable one skilled in the art to make and use this information in a legally-compliant credit scoring model in accordance with aspects of the invention.

For example, a database 110 may contain insurance rating information maintained by one or more insurance companies. The database 110 may contain insurance rating information about a user, including but not limited to, the user's traffic violation history (e.g., driving record), vehicle accident and claim history, property incident and claim history (i.e., incidents that resulted in property damage), insurance payment history, and coverage limits/deductibles with automobile and property insurance carriers. The insurance rating information stored in the database 110 may also be communicated to a computing device 102 for consideration in calculating an enhanced credit score.

For example, any violation on a user's driving record is insurance rating information that may be considered in calculating the enhanced credit score (ECS). Examples of insurance rating information in a user's driving record include any major and minor violations such as a refusal to submit a license, driving while under the influence of alcohol or drugs, suspensions and/or revocations of a driving license and the time period of such suspensions or revocations, driving during a suspension or revocation, hit and run, homicide with automobile, reckless driving/racing, speeding less than 15 miles per hour over the posted limit, speeding 15 miles per hour or more over the posted limit, failure to yield the right of way, violations relating to turning/stopping/signaling, violations relating to signs/signals/markings, violations relating to driving/overtaking/passing, violations relating to equipment, violations relating to license/registration, and other miscellaneous major and minor offenses. In another example, an ECS may consider insurance rating information that may include a user's vehicle accident and/or insurance claim history, including incidents where the user was not at fault; examples include accidents relating to a parked vehicle, backing up a vehicle, a vehicle in an intersection, a head-on collision, hitting an animal, hitting a person, and other incidents that result in vehicular loss. In yet another example, an ECS may be calculated considering insurance rating information that may include a user's property incident and claim history, such as property loss due to fire, theft, wind, water, and other ways known to those skilled in the art. In addition, an ECS may consider one or more of the following insurance rating information: amount of time the user has spent with its most recent (i.e., last) insurance carrier, amount of time the user has spent with its current insurance carrier, amount of time lapse between insurance coverage, and the type of vehicle(s) insured (e.g., high performance, large/small pickup, large sedan, large/mid-size sports utility vehicle, large/small van, luxury/mid-size/small sedan, sports vehicle, subcompact vehicle, specific make/model information, etc.). Furthermore, an ECS may be calculated by considering insurance rating information that may include the user's insurance payment history and coverage limits and deductibles with insurance carriers, including but not limited to bodily injury limits, property damage limits, medical limits, personal injury protection limits, presence of collision and/or comprehensive coverage, collision deductible, and comprehensive deductible. Other examples of insurance rating information useful in calculating an ECS will be apparent to one skilled in the art.

Another example of a database that may contain insurance rating information includes a database 112 of one or more government or government-sponsored entities. Some such entities include, but are not limited to, states' Department of Motor Vehicles (DMV), agencies that maintain county records (e.g., traffic violations issued in a county, etc.), agencies that maintain state records (e.g., traffic violations issued by the state sheriff's office, etc.), and other agencies that maintain public records. A state's DMV may maintain information about a user's traffic violations. Examples of some insurance rating information that may be found in these records include, but are not limited to, speeding (e.g., speeding 1-15 mph over posted limit, speeding 16-25 mph over posted limit, speeding more than 25 mph over posted limit), reckless driving, driving too fast for conditions, failing to stop for school bus, tailgating, inadequate brakes, failing to yield right-of-way, disobeying traffic control signals (e.g., stop sign, yield sign, etc.), railroad crossing violation, improper passing (i.e., changing lane unsafely), driving left of center (i.e., driving in the wrong direction), improper lane usage, leaving the scene of property damage incident, child safety restraint violation, and other violations. Additional examples of insurance rating information that may be found in a user's state DMV records include unlawful use of median strip, non-moving violations (e.g., obtaining a driver's license through deception, making/using counterfeit plates, making/altering a driver's license, parking tickets, etc.), failure to observe direction of an officer, failure to show proof of insurance, failure to show proof of correction, operating a motor vehicle on a sidewalk, failure to yield to emergency vehicles, destruction of agricultural or recreational property, driving in an unsafe manner, improper right or left turn, improper u-turn, improper passing of a school bus, leaving the scene of an accident, driving under the influence (DUI), DUI in a school zone, refusing a chemical test, underage DUI, etc. One skilled in the art will appreciate that other insurance rating information may be available through database 112, and the list provided above is a non-exhaustive list of some such insurance rating information that may be used to calculate a user's enhanced credit score.

In another example, a database 114 may contain insurance rating information from one or more third-party entities. Some such entities' databases include, but are not limited to, the Comprehensive Loss Underwriting Exchange (CLUE) and Current Carrier Database (CCD) by Choicepoint, Automated Property Loss Underwriting System (A-PLUS), and other reliable information sources. The CLUE database is a national insurance industry database containing historical insurance claim information on individuals and/or their properties (e.g., vehicle, home, etc.). The information in the CLUE database is submitted monthly by participating insurers. A computing device 102 may receive insurance rating information from the CLUE database that matches the provided search criteria, such as a user's name, date of birth, and/or driver's license number. The A-PLUS database is a data store of information from nearly 1300 insurance companies contributing reports of property claims. More than 850 automobile insurers have committed to reporting automobile claims to the A-PLUS database. A computing device 102 may receive insurance claim information from the A-PLUS database. Yet another third-party database 114 is the Current Carrier Database (CCD) by Choicepoint. The CCD database includes information pertaining to the existence and length of any lapse in coverage; both vehicle (e.g., automobile) and property coverage. The information in a CCD database, like the information in the other third-party databases, may be communicated to a computing device 102 for use in calculating an enhanced credit score.

Insurance rating information also may include one or more of the following automotive insurance rating factors: amount of insurance coverage (limits/deductibles); distance traveled (e.g., annual vehicle mileage); use of vehicle (e.g., business, pleasure, work, farmers); percentage of vehicle usage; successful completion of specific driver training programs or accident prevention courses; vehicle make, model, model year; price group symbol (based on vehicle manufacturer's suggested retail price (MSRP)); existence of new car; existence of passive restraint devices, antilock brakes, or anti-theft systems; chargeable accidents; non-chargeable accidents; minor traffic violations; major traffic violations; past license suspension/lapse; bodily injury limits purchased from prior insurance carrier; number of consecutive years with current insurance carrier and/or prior insurance carrier(s); existence and length of any lapse in coverage; premium payment options; billing plan options (e.g., use of online bill payment (e.g., CheckFree), pay-in-full discount, down payment, etc.); identity of insurance carriers; non-verifiable driving record; existence of comprehensive, sound system, or tape claims; number of renewals with insurance carriers; ownership of an electronic insurance policy; affinity group membership; distribution channel; likely route to work; type of roads, length of commute, time of commute; automatic toll payment user; location where vehicle is parked when not in use (also known as garaging location); type of location where vehicle is parked when not in use (e.g., in garage, in driveway, on street; also known as garaging type); location where vehicle is parked at work; type of location where vehicle is parked at work (e.g., in high-theft locations, etc.); odometer readings from inspections/emissions tests; maintenance records; Consumer Reports safety rating; incorrect vehicle identification number (VIN); color of car; engine type; engine horsepower; vehicle length, width, wheelbase, weight; transmission type; location of electronic equipment; headlight type (e.g., automatic leveling, xenon, etc.); daytime running lights; premium packages (e.g., leather, etc.); presence of backup camera/other safety devices; prior comprehensive insurance; National Arbitration Forum (NAF) claims; previously stolen vehicle; use of vehicle navigation and/or monitoring service (e.g., OnStar); presence of navigation device; prior bodily injury coverage limit by age; prior bodily injury, and prior bodily injury coverage limit by territory. These rating factors may be contained in one or more databases such as database 110, 112 or 114.

Insurance rating information also may include one or more of the following property insurance rating factors: amount of property insurance coverage (e.g., dwelling limits, deductibles, etc.); type of property insurance coverage (e.g., replacement cost vs. actual cash value); age of dwelling or person of interest; age of renovations (e.g., electrical, plumbing, roof, heating/cooling, etc.); exterior construction of dwelling (e.g., brick, frame, log, fire-resistive, etc.); type of roof; structure of roof; town class (e.g., protective capability of responding fire department); presence of protective devices in dwelling (e.g., fire alarms, smoke detectors, burglar alarms); presence of loss mitigation devices in dwelling (e.g., storm shutters, roof tie-downs, etc.); prior insurance claims; number of miles to responding fire department from dwelling; number of feet to closest fire hydrant from dwelling; distance from dwelling to coastline; distance from dwelling to surrounding brush (in wildfire-prone areas); square footage of dwelling; number of stories (floors) of dwelling; interior quality of construction of dwelling; application of strict building codes to dwelling; presence of wood burning stove; presence of specified dog breeds; number of renewals with property insurance carrier; building frame construction of dwelling (e.g., aluminum, vinyl, stucco, etc.); internal home inspection discount; age of appliances (e.g., washing machine, dishwasher, water heater); age and/or type of heating system; age and/or type of wiring (e.g., amperage of electrical service as a function of size of home, number of occupants, etc.); existence of and number of GFI outlets; attic insulation and ventilation; existence of firewall between garage and living quarters; type of cooking fuel source; speed limit and/or traffic density of street; whether dwelling is on a cul-de-sac or corner lot or within a gated community; lot size; number of stories, bedrooms, bathrooms, etc.; presence of garage or carport at dwelling; distance from tall trees to house and/or chimney; age of roof of dwelling; existence of motion-activated exterior floodlights; presence of fireplace; presence of chimney cap and/or spark arrester; existence of locks on windows; use of impact-resistant roofing material; use of fire-treated lumber; windbreak to west of house; direction of doors; whether prior occupants had home insurance; prior claims at address, neighborhood (not individual); prior claims by type; builder/contractor name; presence of pool, diving board, hot tub (above ground vs. in ground, fenced vs. unfenced); presence of trampoline; whether the dwelling is in a flood zone; presence of rental unit, mobile home, or other additional dwelling on property; existence of solar panels; dog ownership. These property factors may be contained in one or more databases such as database 110, 112 or 114.

Additional information that may be considered in deriving an enhanced credit score include one or more of the following individual rating factors: rent payment history, past evictions; check transaction history (e.g., TeleCheck); type of mortgage; supermarket shopping patterns; media usage patterns (magazines, television, radio); type of driver's license; out of U.S. driving experience; presence and/or type of health insurance; health/medical history; reaction time, peripheral vision, and/or similar capabilities; whether the user is a smoker; SAT scores; whether the user lives with the user's parents; number and/or length of cell phone calls from car; past insurance policy change behavior; years in area (vs. years at residence); direct mail responder; customer care registration; ownership and/or characteristics of life insurance; purchase of extended warranties, home warranty, etc.; existence of home alarm; multiple home ownership; boat ownership; aircraft ownership; gun ownership). These individual rating factors may be contained in one or more databases such as database 110, 112 or 114.

Additional information that may be considered in deriving an enhanced credit score include one or more of the following geographic rating factors: litigation rate of dwelling area; weather of dwelling area; crime of dwelling area; speeding violations per capita of dwelling area; seatbelt violations per capita of dwelling area; per capita alcohol consumption of dwelling area; alcohol retail licenses per capita of dwelling area; number of hospitals per square mile of dwelling area; percent of nonstandard, uninsured drivers in dwelling area; road density of dwelling area; type of roads in dwelling area; traffic density in dwelling area; voter registration and/or turnout rates of dwelling area; vehicle registrations per capita in dwelling area; make and/or model distribution of dwelling area; neighborhood watch program in dwelling area; building code effectiveness rating of dwelling area; forest cover of dwelling area; elevation of dwelling area; vacant homes in neighborhood; sinkhole locations in dwelling area; school achievement scores in dwelling area. These geographic rating factors may be contained in one or more databases such as database 110, 112 or 114.

Additional information that may be considered in deriving an enhanced credit score include one or more of the following vehicle monitoring rating factors: airbag deployment; anti-lock braking system (ABS) application; anti-theft system disablement; back-up lights on; barometric pressure; brake light on; brakes applied; closing speed of vehicle in rear; closing speed of vehicle in rear; closing speed of vehicle to side (right or left); closing speed of vehicle to side (right or left); closing speed on vehicle in front; cruise control engaged; date; distance traveled (e.g., annual vehicle mileage); distance traveled; door open; doors locked; driver identification (e.g., through voice recognition, code, fingerprint or retinal recognition, etc.); engine coolant temperature; engine revolutions per minute (RPM); environmental hazard conditions (e.g., icing, etc.); environmental hazard conditions (e.g., icing, etc.); hazard lights on; headlamps on; horn applied; information from body sensors; information from electrical sensors; information from other elements; information from power train sensors; intake air temperature; Intelligent Vehicle Highway System (IVHS) data sources; key in door lock; key in ignition; lateral acceleration; level of fuel in tank; number of minutes the user drives at high-risk and/or low-risk times (e.g., rush hour or Sunday afternoon); number of minutes the user drives in high-risk and/or low-risk locations (e.g., locations with high and/or low rates of accidents); number of sudden acceleration and/or deceleration situations; number of sudden braking situations; observance of speed limits; observance of traffic control devices; observation of traffic signals and signs; observation of traffic signals and signs; occupant in seat; odometer reading; parking lights on; pitch and roll; power train sensors; presence of alcohol in the driver's blood (e.g., using an air content analyzer or breath analyzer); radio station tuned in; relative distance to other objects; road conditions; safe driving behavior; seat belt on; space to front of vehicle occupied; space to rear of vehicle occupied; space to side of vehicle occupied; sudden loss of tire pressure; sudden rotation of vehicle; tail gate open; throttle position; time; total driving time in minutes by each driver of a vehicle; traffic conditions; transmission setting (e.g., park, drive, gear, neutral); turn signal indicator; use of turn signals; using seat belts; vehicle direction; vehicle in skid; vehicle location; vehicle position; vehicle speed in excess of speed limit; vehicle speed; wheels in spin; wipers on. These vehicle monitoring rating factors may be contained in one or more databases such as database 110, 112 or 114.

The vehicle monitoring rating factors described above can be categorized as telematics data. Telematics data can be obtained through systems that can consist of sensors connected to a vehicle that respond to a physical stimulus (heat, light, sound, pressure, motion, flow, and so on), and produce a corresponding electrical signal(s) that can be recorded or input directly into a computer to obtain valuable information about the vehicle's operational condition.

In some embodiments, telematics data can include sensor data that was recorded with onboard equipment and later transferred to other systems for analysis. With improvements in computer technology, data obtained from sensors could be analyzed and either stored or provided to the vehicle operator with operational information. Additional improvements in communication combined with onboard data processing and storage can provide means for real-time monitoring of fleet vehicles. Advancement in telematics in some embodiments allows for data obtained by the vehicle sensors to be transferred to databases located anywhere in the world.

Telematics data can be obtained from device monitoring and recording systems which are particularly applicable to systems of on-board vehicle monitoring and recording of operating engine parameters that are known in the art. For example, in U.S. Pat. No. 4,258,421 to Juhasz et al., the system comprises a plurality of sensors for sensing operating parameters of the engine and for generating data signals in response thereto, a data processing unit for receiving the data signals, and a portable data link for extracting the processed data. Means are also provided for analyzing the processed data in remote computing means to provide printouts for record keeping, maintenance and diagnostic purposes.

In addition, telematics data can be obtained from methods for determining whether vehicle servicing or maintenance is required, which are well known in the art. For example U.S. Pat. No. 6,677,854 to Dix et al, describes a method whereby vehicle maintenance information is downloaded to a remote computer via a wireless link. The information includes sensor data such as temperatures and pressures of fluid in the vehicle.

In addition, other methods and systems for collection and processing of telematics data and telematics data transfer are known in the prior art. For example, U.S. Pat. No. 6,931,309 to Phelan et al, describes such methods and systems.

Additional information that may be considered in deriving an enhanced credit score include one or more of the following interaction rating factors, which are functions of two or more insurance rating factors that correlate to quantifiable change in risk, positive or negative, compared to risk correlated to the factors separately. The factors making up the interaction rating factors may come from various groups of factors such as those described herein, namely automobile rating factors, property rating factors, individual rating factors, geographic rating factors, and vehicle monitoring rating factors. Actuarial methods are used to identify combinations of insurance rating factors that have a high level of statistical correlation to risk of loss. These combinations of factors, once identified, are classified as interaction rating factors. Examples of interaction rating factors may include prior violations by type; prior violations by age; prior insurance bodily injury limit by age; prior insurance years by territory; discounts by tier; prior accident surcharge by additional claim characteristics (e.g., hit by unidentified driver, hit fixed object, etc.); number of cars by territory; number of occupants in dwelling as a function of square footage of dwelling; number of occupants as a function of square footage, prior insurance years, and territory; prior insurance bodily injury limit as a function of age and seat belt use. These interaction rating factors may be contained in one or more databases such as database 110, 112 or 114.

The computing device 102 may be configured to calculate an enhanced credit score of a user. The enhanced credit score may be concrete, tangible, and useful in determining the terms of a credit agreement between the user and a lender or other entity/individual. In one example, the computing device 102 may be an Internet kiosk, such as the self-service kiosk of U.S. Application Ser. No. 60/764,994 entitled "Self-Service Kiosk" filed on Feb. 3, 2006, the disclosures of which are expressly incorporated herein by reference in its entirety; in another example, the computing device 102 may be a handheld device. For example, a self-service user in a shopping mall may use computing device 102 to obtain the user's enhanced credit score. The computing device 102 may be comprised of a processing unit 104 and/or memory unit 106. The processing unit 104 may be comprised of a conventional processor for executing computer-executable instructions. One skilled in the art will understand that the processor may be pre-programmed or hard-wired with computer-executable instructions, or the processor may be a general purpose processor that executes or performs encoded instructions. The memory unit 106 may be comprised of volatile and/or non-volatile memory for storing, among other things, computer-executable instructions. At least some of these computer-executable instructions may be executed by the processing unit 104 to measure the potential credit risk of a user. The computer-executable instructions may be arranged as modules that interact with other modules and devices in accordance with aspects of the invention.

Figure 2:
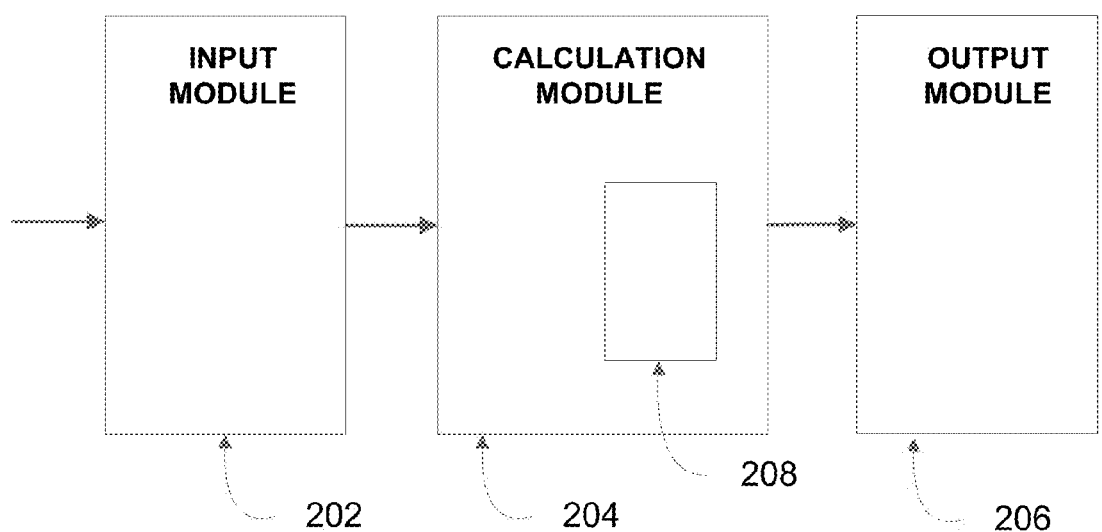
FIG. 2 illustrates a block diagram of computer modules interacting in accordance with various aspects of the invention.

Referring to FIG. 2, the computer-executable instructions may be arranged into an input module 202, a calculation module 204, and/or an output module 206. These computer-executable instructions may be executed by the processing unit 104 to cause a computing device 102 to behave as described herein. The input module 202 may receive credit risk information and insurance rating information, individual rating factors, interaction rating factors, geographic rating factors, vehicle monitoring rating factors and/or credit risk information from at least one of the remote databases 110, 112, 114. The input module 202 may also receive insurance rating information, individual rating factors, interaction rating factors, geographic rating factors, and/or vehicle monitoring rating factors from an input device (e.g., keyboard, mouse, etc.) coupled to the computing device 102. Various examples of credit risk information, insurance rating information, individual rating factors, interaction rating factors, geographic rating factors, and vehicle monitoring rating factors have been provided herein, and additional examples will be apparent to one skilled in the art after review of the disclosure. Next, the insurance rating information, individual rating factors, interaction rating factors, geographic rating factors, and/or vehicle monitoring rating factors may be provided as an input into the calculation module 204. The calculation module 204 may use the insurance rating information, individual rating factors, interaction rating factors, geographic rating factors, and/or vehicle monitoring rating factors and other information, as inputs into a credit-scoring model 208 to calculate an enhanced credit score for a user. The calculation module 204 may determine the enhanced credit score of a user by causing the computing device 102 to calculate the sum of a plurality of results (e.g., a first result and a second result). Once the enhanced credit score of the user is calculated, the enhanced credit score may be provided by the calculation module 204 to an output module 206 for displaying on an output device (e.g., screen display, printer, etc.) coupled to the computing device 102.

The calculation module 204 may be comprised of a credit-scoring model 208 and computer-executable instructions for calculating an enhanced credit score of a user. The credit scoring model 208 may be based on an analysis of research on numerous individual consumer credit reports and insurance rating information, individual rating factors, interaction rating factors, geographic rating factors, and/or vehicle monitoring rating factors. For example, pertinent variables from credit reports may be used in constructing a credit-scoring model 208. The analysis and research to build a credit-scoring model 208 in accordance with aspects of the invention entail using prior credit risk information (e.g., information from credit reports), insurance rating information (e.g., traffic violation history, insurance payment history, insurance claim history, and presence and duration of personal automobile and/or property insurance), individual rating factors, interaction rating factors, geographic rating factors, and/or vehicle monitoring rating factors to predict future information of a user. The future information that the credit-scoring model 208 may be built to predict includes the anticipated behavior of a user to fulfill financial obligations (e.g., repayment of debt obligations, payment of lease installments, etc.). The credit-scoring model 208 that is created through the analysis and research may be used as a predictor of expected user behavior (e.g., a gauge on confidence that a user will fulfill a debt obligation).

In an alternative embodiment in accordance with aspects of the invention, only insurance rating information relating to a user is input into the credit-scoring model 208 to calculate the enhanced credit score of a user. Such a credit-scoring model does not use prior credit risk information of the user in calculating an enhanced credit score. For example, young people or people with little or no credit history may benefit from such a credit-score model because the model considers factors not previously used by conventional credit scoring methods. In yet another embodiment in accordance with aspects of the invention, credit risk information and a vehicle monitoring rating factor relating to a user are input into the credit-scoring model 208 to calculate the enhanced credit score of a user. In another embodiment in accordance with aspects of the invention, only vehicle monitoring rating factors relating to a user are input into the credit-scoring model 208 to calculate the enhanced credit score of a user. In another embodiment in accordance with aspects of the invention, only individual factors relating to a user are input into the credit-scoring model 208 to calculate the enhanced credit score of a user. In another embodiment in accordance with aspects of the invention, only geographic rating factors relating to a user are input into the credit-scoring model 208 to calculate the enhanced credit score of a user. In another embodiment in accordance with aspects of the invention, only interaction rating factors relating to a user are input into the credit-scoring model 208 to calculate the enhanced credit score of a user.

In one embodiment in accordance with aspects of the invention, a credit-scoring model 208 may be constructed by identifying information that analysis and research shows to be a predictor of a user's future behavior. This predictive information may be organized into variables (i.e., factors) for use in the credit-scoring model 208. Statistical research and testing may be performed to determine any correlation between the variables. In one embodiment, the analysis results in the identification of dependent variables on a univariate basis. Dependent variables may be described as those variables that the model is attempting to predict (e.g., whether or not the user fulfilled financial obligations). Based on each variable's univariate results, a determination may be made to group and/or cap the variables. Capping involves setting the value of a variable to a predetermined value if the value is above a specified threshold value. Grouping involves arranging a value or range of values of a given variable into distinct groups. Grouping essentially results in the creation of additional new independent variables for the credit-scoring model 208. Independent variables are those variables that act as inputs into the credit-scoring model 208. Furthermore, the credit-scoring model 208 may be comprised of a plurality of coefficients generated through statistical analysis and research. A coefficient may be assigned to each variable and used to calculate an enhanced credit score. The resulting credit-scoring model 208 is able to effectively weigh the relative importance of each variable in calculating an overall enhanced credit score. One skilled in the art will recognize that analytical approaches, such as regression approaches, least squared regression, and logistic regression, may be used to identify coefficients and independent variables for the credit-scoring model 208. Other examples of analytical approaches that may be used to construct parts of a credit-scoring model include generalized linear models (GLMs), generalized additive models, generalized minimum bias modeling, modeling based on Bayesian theory, and other methods that fit data by maximizing the likelihood function or minimizing deviance functions. The credit-scoring model 208 may be determined, at least in part, by testing various regression results on a separate validation dataset and comparing predictability of the various resulting models. The resulting credit-scoring model 208 may be configured to weigh the relative importance of each variable in calculating on overall enhanced credit score. The analytical approach to obtain the set of independent variables and coefficients can be done separately for the particular credit needs (e.g., credit cards, home loans, etc.). Therefore, separate independent variables and coefficients may be used for a credit card scoring model versus a home loan credit scoring model.

For example, a simplified credit-scoring model 208 may include the following mathematical formula or algorithm:
Enhanced Credit Score=
(Coefficient #1)×(Number of Credit Card Inquiries in the Past 6 Months)+
(Coefficient #2)×(Number of Non-Credit Card Inquiries in the Past 2 Years)+
(Coefficient #3)×(Number of Active Trade Line Accounts)+
(Coefficient #4)×(Number of Accounts Opened in the Past Year)+
(Coefficient #5)×(Average Age of Active Trade Line Accounts)+
(Coefficient #6)×(Number of Credit Cards with a Balance>$1,000)+
(Coefficient #7)×(Number of Collections>$100 in the Past 5 Years)+
(Coefficient #8)×(Number of Derogatory Public Records in the Past 5 Years)+
(Coefficient #9)×(Number of Minor Traffic Violations in the Past 5 Years)+
(Coefficient #10)×(Use of Online Bill Payment)+
(Coefficient #11)×(Number of Occupants in Dwelling*Square Footage of Dwelling)+
(Coefficient #12)×(Voter Registration/Turnout Rates of Dwelling Area)+
(Coefficient #13)×(Number of Sudden Braking Situations)

The independent variables corresponding to coefficient number 1 through coefficient number 8 may be related to credit risk information retrieved from a conventional database and/or credit report. The independent variables corresponding to coefficient number 9 through coefficient number 13 may be related to insurance rating information, individual rating factors, interaction rating factors, geographic rating factors, and/or vehicle monitoring rating factors retrieved from one or more databases 110, 112, 114. As shown in the example above, each independent variable and its corresponding coefficient may be multiplied to calculate a resulting value. The coefficients may be assigned numeric values (e.g., 4.55, 5.40, −4, 3, etc.) to be multiplied with each corresponding variable. The enhanced credit score may be determined by calculating the sum of each of the values resulting from this arithmetic operation (e.g., the sum of the first result and second result).

In addition, as described earlier in relation to grouping, some of the independent variables may be created through a combination of a plurality of insurance rating information (e.g., first insurance rating information and second insurance rating information). For example, a variable in a credit-scoring model 208 that represents the total number of traffic violations (both minor and major) in the past predetermined number of years is an example of an independent variable created through a combination. One skilled in the art will understand that although the illustrative mathematical formula listed above describes a specific number of years for some of the variables (e.g., number of major traffic violations in the past 5 years), the invention is not so limited. The number of years may be any predetermined amount.

In another embodiment, the credit-scoring model 208 may be used to calculate an enhanced credit score of a user by performing arithmetic operations on a conventional credit score of a user and a quantitative expression of insurance risk of the same user. One example of a quantitative expression of the insurance risk of a user is an insurance class rating. An insurance class rating is a mathematical summary of a user's likelihood of submitting or incurring an insurance claim and is calculated using sophisticated insurance scoring algorithms which consider various insurance factors. Another example of a quantitative expression of the insurance risk of a user is an insurance score. An insurance score is also a mathematical summary of a user's likelihood of submitting or incurring an insurance claim, but an insurance score is calculated using sophisticated insurance scoring algorithms which consider various credit factors. The credit-scoring model 208 may be used to calculate an enhanced credit score of a user by performing arithmetic operations on a conventional credit score of a user and a quantitative expression of insurance risk (e.g., insurance class rating, insurance score, etc.) of the same user. For example, in an illustrative credit-scoring model that equally weighs a user's insurance class rating and conventional credit score, the user's insurance class rating and conventional credit score will be added together and the sum divided by two to calculate the user's enhanced credit score.

Once calculated, a user's enhanced credit score may be used to determine the terms of a financing agreement for that user. Financing agreements include agreements wherein a user may receive financing. Examples of financing agreements include, but are not limited to: loan agreements; credit card agreements; lease agreements; rental agreements; retail accounts; installment loans; finance company accounts; agreements involving mortgages, mortgage purchase, and/or mortgage refinance; home equity loans; automobile loans; unsecured personal loans; student loans; consolidated debt agreements; and commercial loans. A user's enhanced credit score also may used to determine the terms of utility background checks, employee screening, preferred airport screening for frequent fliers, and other applications where an enhanced credit score could be used. In one example in accordance with aspects of the invention, the financing agreement may be for a lease to the user. The terms of the lease agreement may include a payment amount for monthly lease payment and an amount for down payment. The leasing entity may adjust the required minimum down payment amount according to the user's enhanced credit score. In another example in accordance with aspects of the invention, the financing agreement may be for a loan to a user from a lender. The terms of the loan agreement offered by the lender may include, but are not limited to, an interest rate of the loan and an amount of the loan. The lender may adjust the terms of the loan agreement according to the calculated enhanced credit score of the user. Other examples of financing agreements and the terms of those financing agreements will be apparent to one skilled in the art.

Figure 3:
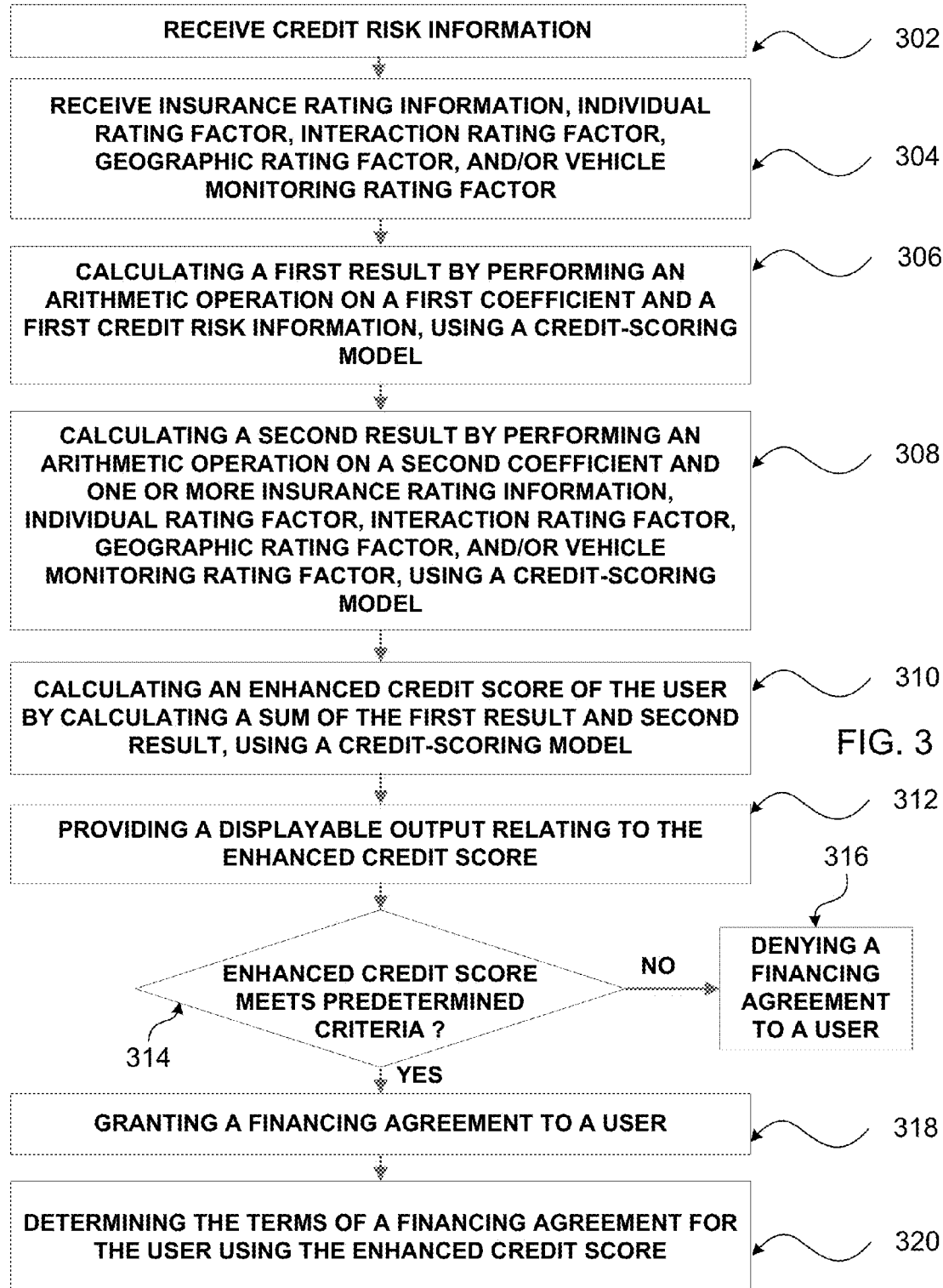
FIG. 3 shows a flowchart of a method for calculating an enhanced credit score in accordance with various aspects of the invention.

Referring to FIG. 3, in one example in accordance with aspects of the invention, a customer (referred to herein as Customer A) may desire a loan from a lender. The lender may utilize a computing device 102 containing an input module 202, calculation module 204, and output module 206 to assess the credit risk associated with lending money to Customer A. The input module 202 may receive (in step 302) credit risk information from a remote database and/or credit report. The credit risk information may include Customer A's credit score. Other information, as described earlier, may also be included in the credit risk information. The input module 202 may also receive (in step 304) insurance rating information, individual rating factors, interaction rating factors, geographic rating factors, and/or vehicle monitoring rating factors from one or more remote databases 110, 112, 114. The insurance rating information may include, but is not limited to: the number of insurance claims made in the past predetermined number of years; number of major and/or minor violations in the past predetermined number of years; number of accidents in the past predetermined number of years; automobile insurance lapse in the past predetermined number of years; number of speeding citations in the past predetermined number of years; number of reckless driving citations; number of citations for tailgating; number of citations for disobeying traffic control signals; number of citations for driving under the influence (DUI); and any of the other insurance rating information, individual rating factors, interaction rating factors, geographic rating factors, and/or vehicle monitoring rating factors described earlier. One skilled in the art will understand that any of the information retrieved from the databases described earlier may be used as insurance rating information, individual rating factors, interaction rating factors, geographic rating factors, and/or vehicle monitoring rating factors. In the example concerning Customer A, the information received may indicate that Customer A has had three credit cards with a balance of over $1000, twenty collections of over $100 in the past five years, seven minor traffic violations in the past five years, and two vehicle accidents in the past three years. This information may be inputted to a credit-scoring model 208 in a calculation module 204 to calculate an enhanced credit score.

A credit-scoring model 208 in accordance with aspects of the invention comprises coefficients and variables for calculating an enhanced credit score. In step 306, a first result may be calculated by performing an arithmetic operation (e.g., multiplication) on a first coefficient (e.g., coefficient #6 with a value of 8.75) and a first credit risk information (e.g., Customer A has three credit cards with a balance of over $1000). In step 308, a second result may be calculated by performing an arithmetic operation (e.g., multiplication) on a second coefficient (e.g., coefficient #11 with a value of 8.5) and a first insurance rating information (e.g., Customer A had two vehicle accidents in the past three years). Next, in step 310, an enhanced credit score may be calculated by performing an arithmetic operation (e.g., adding, multiplying, dividing, etc.) between the first result and second result. For example, Customer A may have an enhanced credit score of 700 after all variables and coefficients in the credit-scoring model 208 have been added together. Although the enhanced credit score in this example is a numeric value, in other embodiments, it may be a non-numeric representation (e.g., "high risk", "low risk", "medium risk", etc.).

In step 312, the output module 206 may provide a displayable output relating to the enhanced credit score. The lender may be provided with a computer screen displaying Customer A's enhanced credit score of 700. One skilled in the art will appreciate that one or more steps in the flowchart of FIG. 3 may not be necessary or desired in accordance with various aspects of the invention. For example, in some embodiments, the computing device 102 may not display the raw enhanced credit score, but rather, it may display only a "yes" or "no" to indicate whether Customer A's score meets a predetermined threshold. In step 314, a user's enhanced credit score may be compared to one or more predetermined criteria to determine whether the criteria have been met. For example, if the enhanced credit score of the user is outside a predetermined range of values, then the criterion has not been met. Assuming the predetermined range is 750-850, then Customer A's score of 700 would not meet the predetermined criterion. A lender may use the determination in step 314 to deny (in step 316) Customer A a financing agreement (e.g., loan agreement) or to provide Customer A with a financing agreement (e.g., loan agreement) with a higher interest rate (e.g., 4% over the prime rate). In some embodiments, a user's enhanced credit score might not be the sole criterion in determining whether the user is granted or denied a financing agreement. Assuming Customer A's enhanced credit score of 700 meets predetermined criteria in step 314, the lender may decide to grant (in step 318) a financing agreement (e.g., loan) to Customer A. A lender may use the enhanced credit score to determine (in step 320) the terms of the financing agreement for the user.

Those skilled in the art will appreciate that the steps illustrated in FIG. 3 may be performed in other than the recited order, and that one or more steps illustrated in FIG. 3 may be optional. For example, in some embodiments in accordance with aspects of the invention only insurance rating information relating to a user is input into the credit-scoring model 208 to calculate the enhanced credit score of a user. Such a credit-scoring model does not use prior credit risk information (step 302, FIG. 3) of the user in calculating an enhanced credit score. This example and other examples relating to FIG. 3 will be apparent to one skilled in the art after review of the entirety disclosed.

In another example of aspects of the invention, a user (referred to herein as Customer B) desires to purchase a new car from Dealer A and applies for a car loan. Customer B fills out the standard loan application, and the finance manager for the dealer obtains a conventional credit score. Customer B's score is slightly lower than the dealer's minimum credit score required to grant the loan. Dealer A reluctantly denies the loan.

Customer B then goes to Dealer B, where she again fills out a loan application. Dealer B uses a system that obtains a combination of Customer B's conventional credit information as well as insurance rating information including insurance records and records from the department of motor vehicles, individual rating factors, interaction rating factors, geographic rating factors, and/or vehicle monitoring rating factors for use as additional predictive factors. The loan approval system combines the various types of information to calculate an enhanced credit score. This time, Customer B's score is above the required minimum, and Dealer B grants Customer B the car loan.

In a further example regarding Dealer B and Customer B, Dealer B's determination is in part determined by insurance factors that included number of accidents in the last 3 years, the number of speeding convictions in the last 3 years, proof of Customer B's automobile insurance coverage for the last 3 years, coverage levels maintained during that period, Customer B's use of online bill payment in the previous year, the number of occupants in Customer B's dwelling in the prior year multiplied by the square footage of dwelling, the voter registration and voter turnout rates of Customer B's dwelling area over the last five years, and the number of sudden braking situations in which Customer B had been involved in the past year. In addition, the system may consider criminal records such as robbery, assault, larceny, and other offenses that have been identified by the system as predictive.

In another example of aspects of the invention, a dealer such as Dealer B obtains an enhanced credit score from a third party that is based on factors described herein. In yet a further example of aspects of the invention, the enhanced credit factors that are considered by the dealer, such as Dealer B, are non-traditional credit factors only and may be only insurance factors. In a further example, an entity offering credit, such as a credit card or a loan, to an agent or the company's book of business may use insurance rating information, individual rating factors, interaction rating factors, geographic rating factors, and/or vehicle monitoring rating factors, along with other information to determine the terms of the credit. In an additional example, an enhanced credit score can be determined for a particular user and a pre-approved loan offer, whose terms are based at least in part on the enhanced credit score, can be sent to the user via direct mail.

While the invention has been described with respect to specific examples including presently exemplary modes of carrying out the invention, those skilled in the art will appreciate that there are numerous variations and permutations of the above-described systems and techniques that fall within the spirit and scope of the invention as set forth in the appended claims.

I claim:

1. A computer-assisted method of calculating an enhanced credit score of a user, the method comprising:

measuring, by one or more telematics sensors connected to a vehicle of the user, at least one vehicle monitoring rating factor relating to the user;

receiving, by a processor using an input module of a computer, credit risk information, insurance rating information from at least one of: a governmental entity database coupled to the computer through a network and a third-party entity database coupled to the computer through the network, and the at least one vehicle monitoring rating factor relating to the user;

calculating an enhanced credit score for the user using the credit risk information, the insurance rating information, and the at least one vehicle monitoring rating factor, and the calculating is performed by the processor using a calculation module of the computer; and determining, by the processor of the computer, terms of a financing agreement for the user using the enhanced credit score, wherein the calculating the enhanced credit score comprises:

calculating, by the processor using the calculation module, a first result by performing multiplication on a first coefficient and at least a portion of the credit risk information comprising a number of active accounts;

calculating, by the processor using the calculation module, a second result by performing multiplication on a second coefficient and at least a portion of the credit risk information comprising an average age of active accounts;

calculating, by the processor using the calculation module, a third result by performing multiplication on a third coefficient and at least a portion of the credit risk information comprising a number of credit cards with a balance greater than a first predetermined amount;

calculating, by the processor using the calculation module, a fourth result by performing multiplication on a fourth coefficient and at least a portion of the credit risk information comprising a number of collections of greater than a second predetermined amount in a past first predetermined number of years;

calculating, by the processor using the calculation module, a fifth result by performing multiplication on a fifth coefficient and the insurance rating information comprising a number of minor traffic violations in the past second predetermined number of years;

calculating, by the processor using the calculation module, a sixth result by performing multiplication on a sixth coefficient and the insurance rating information comprising a number of occupants in a dwelling of the user times the square footage of the dwelling;

calculating, by the processor using the calculation module, a seventh result by performing multiplication on a seventh coefficient and the at least one vehicle monitoring rating factor comprising a number of sudden braking situations.

2. The computer-assisted method of claim 1, wherein the financing agreement is a credit agreement and the terms of the credit agreement comprise an interest rate on outstanding balances on the credit agreement.

3. The computer-assisted method of claim 1, wherein the financing agreement is a credit agreement and the determining the terms of the credit agreement further comprises:

denying the credit agreement to the user and displaying a "no" message on a displayable output of the computer, if the enhanced credit score of the user does not meet predetermined criteria; and granting the credit agreement to the user and displaying an "yes" message on the displayable output of the computer, if the enhanced credit score of the user does meet predetermined criteria.

4. The method of claim 1, wherein the insurance rating information comprises at least one of: number of minor violations in the past predetermined number of years, number of major violations in the past predetermined number of years, number of accidents in the past predetermined number of years, current status of automobile insurance, automobile insurance lapse in the past predetermined number of years, number of speeding citations, number of reckless driving citations, number of citations for driving under the influence (DUI), number of citations for disobeying traffic control signals, and number of insurance claims made in the past predetermined number of years.

5. The method of claim 4, wherein the insurance rating information relates to the user's operation of a vehicle, and the insurance rating information further comprises the number of minor violations in the past predetermined number of years, the number of major violations in the past predetermined number of years, the number of accidents in the past predetermined number of years, and the number of insurance claims made in the past predetermined number of years.

6. The method of claim 1, wherein the insurance rating information comprises number of speeding citations, and the telematics sensors include at least one of: an air content analyzer and a breath analyzer.

7. The method of claim 1, wherein the insurance rating information comprises exterior construction of dwelling.

8. The method of claim 1, wherein the at least one vehicle monitoring rating factor comprises at least one of: number of minutes driving in high-risk locations in the past predetermined number of years, number of minutes of driving at high-risk times in the past predetermined number of years, number of sudden acceleration situations in the past predetermined number of years, number of sudden braking situations in the past predetermined number of years, number of occasions of airbag deployment in the past predetermined number of years, number of occasions of hazard lights on in past predetermined number of years, average level of fuel in tank in past predetermined number of years, and average level of vehicle speed in past predetermined number of years.

9. The computer-assisted method of claim 1, wherein the financing agreement is for a loan to at least the user, and the terms of the financing agreement comprise an interest rate of the loan and an amount of the loan.

10. A non-transitory computer-readable medium comprising computer-executable instructions for causing a computing device to perform steps comprising:
(a) receiving a user's credit risk information and insurance rating information from a database coupled to the computing device through a network;
(b) calculating an enhanced credit score of the user using the credit risk information and the insurance rating information, wherein the calculating the enhanced credit score comprises:
calculating a first result by performing an arithmetic operation on a first coefficient and at least a portion of the credit risk information;
calculating a second result by performing an arithmetic operation on at least one of a second set of coefficients and at least one of the insurance rating information comprising a number of minor traffic violations in the past first predetermined number of years, and a number of occupants in a dwelling of the user times the square footage of the dwelling, wherein a different one of the at least one of the second set of coefficients is used with each of the number of minor traffic violations and the number of occupants in the dwelling; and
calculating a sum of at least the first result and the second result to determine the enhanced credit score of the user; and
(c) displaying an "yes" message on a displayable output of the computing device when the enhanced credit score of the user meets predetermined criteria.

11. The computer-readable medium of claim 10, further comprising:
(g) receiving an individual rating factor relating to the user, wherein the step of calculating the enhanced credit score for the user further comprises using the individual rating factor; and
(h) calculating a fourth result by performing an arithmetic operation on a fourth coefficient and the individual rating factor, wherein step (f) comprises calculating a sum of the first result, the second result, the third result, and the fourth result to determine the enhanced credit score of the user.

12. The computer-readable medium of claim 10 further comprising:
(g) receiving an interaction rating factor relating to the user, wherein the step of calculating the enhanced credit score for the user further comprises using the interaction rating factor; and
(h) calculating a fourth result by performing an arithmetic operation on a fourth coefficient and the interaction rating factor, wherein step (f) comprises calculating a sum of the first result, the second result, the third result, and the fourth result to determine the enhanced credit score of the user.

13. The computer-readable medium of claim 10 further comprising:
(g) receiving a geographic rating factor relating to the user, wherein the step of calculating the enhanced credit score for the user further comprises using the geographic rating factor; and
(h) calculating a fourth result by performing an arithmetic operation on a fourth coefficient and the geographic rating factor, wherein step (f) comprises calculating a sum of the first result, the second result, the third result, and the fourth result to determine the enhanced credit score of the user.

14. The computer-readable medium of claim 10, wherein step (a) further comprises receiving, through a network from one or more telematics sensors connected to a vehicle of the user, at least one vehicle monitoring rating factor relating to the user; and wherein step (b) further comprises calculating the enhanced credit score using the at least one vehicle monitoring rating factor.

15. The computer-readable medium of claim 14, wherein the telematics sensors comprise an analyzer configured to detect presence of alcohol in the user's blood; and further comprising computer-executable for causing the computing device to further perform steps comprising:
determining terms of a financing agreement for the user using the enhanced credit score.

16. The computer-readable medium of claim 14, wherein the at least one vehicle monitoring rating factor comprises at least one of: number of minutes driving in high-risk locations in the past predetermined number of years, number of minutes of driving at high-risk times in the past predetermined number of years, number of sudden acceleration situations in the past predetermined number of years, number of sudden braking situations in the past predetermined number of years, number of occasions of airbag deployment in the past predetermined number of years, number of occasions of hazard lights on in past predetermined number of years, average level of fuel in tank in past predetermined number of years, and average level of vehicle speed in past predetermined number of years; and the calculating of the enhanced credit score uses a credit-scoring model; and wherein the insurance rating information relates to the user's operation of a vehicle, and the insurance rating information further comprises the number of minor violations in the past predetermined number of years, the number of major violations in the past predetermined number of years, the number of accidents in the past predetermined number of years, and the number of insurance claims made in the past predetermined number of years.

17. A computing system configured to calculate an enhanced credit score of a user, the computing system comprising:
a telematics sensor, connected to a vehicle of the user, that is configured to measure vehicle monitoring rating factors related to the user's operation of the vehicle;
a network through which the vehicle monitoring rating factors are sent from the telematics sensor to the processing unit;
a processing unit comprising a processor for executing computer-executable instructions; and
a memory unit storing computer-executable instructions, which when executed by the processing unit, cause the processing unit to calculate the enhanced credit score of the user, the computer-executable instructions comprising:
- an input module configured to receive credit risk information, the insurance rating information, and the vehicle monitoring rating factors from the telematics sensor;
- a calculation module configured to calculate the enhanced credit score of the user using the credit risk information, vehicle monitoring rating factors, and insurance rating information; and
- an output module configured to send the enhanced credit score of the user to a display screen, wherein the calculation module is configured to calculate the enhanced credit score of the user by causing the processing unit to calculate a sum of:
- a first arithmetic operation on a first coefficient and at least a part of the insurance rating information comprising a number of minor traffic violations in the past second predetermined number of years;
- a second arithmetic operation on a second coefficient and at least a part of the credit risk information; and
- a third arithmetic operation on a third coefficient and at least a part of the vehicle monitoring rating factors comprising a number of sudden braking situations.

18. The computing system of claim 17, further comprising:
an analyzer configured to detect presence of alcohol in the user's blood, wherein the vehicle monitoring rating factors include output of the analyzer.

19. The computing system of claim 17, the system further comprising at least one of: a governmental entity database and a third-party entity database configured to send insurance rating information, wherein the input module is further configured to receive at least one vehicle monitoring rating factor and at least one of: an individual rating factor, an interaction rating factor, and a geographic rating factor; and wherein the calculation module is further configured to calculate the enhanced credit score of the user using the at least one vehicle monitoring rating factor and the at least one of: the individual rating factor, the interaction rating factor, and the geographic rating factor; and wherein the insurance rating information relates to the user's operation of a vehicle, and the insurance rating information further comprises the number of minor violations in the past predetermined number of years, the number of major violations in the past predetermined number of years, the number of accidents in the past predetermined number of years, and the number of insurance claims made in the past predetermined number of years.

20. The computing system of claim 19, wherein the calculation module further calculates the enhanced credit score of the user by causing the processing unit to perform steps comprising:
- calculating a seventh result by performing an arithmetic operation on a seventh coefficient and at least one interaction rating factor;
- calculating a fourth result by performing an arithmetic operation on a fourth coefficient and at least one geographic rating factor;
- calculating a fifth result by performing an arithmetic operation on a fifth coefficient and at least one vehicle monitoring rating factor;
- calculating a sixth result by performing an arithmetic operation on a sixth coefficient and at least one individual rating information; and
- calculating a sum of the seventh result, the fourth result, the fifth result, and the sixth result to further determine the enhanced credit score of the user.

21. The computing system of claim 17, wherein the stored computer-executable instructions cause the processing unit to determine the terms of a financing agreement for the user using the enhanced credit score.

* * * * *